United States Patent Office

3,407,180
Patented Oct. 22, 1968

3,407,180
TREATMENT OF POLYAMIDES
Jean Bounoure and Georges Durand, Mourenx, France, assignors to Societe Nationale des Petroles d'Aquitaine, Paris, France
No Drawing. Filed Oct. 15, 1965, Ser. No. 496,693
Claims priority, application France, Oct. 20, 1964, 991,989
4 Claims. (Cl. 260—78)

ABSTRACT OF THE DISCLOSURE

This invention relates to the treatment of polycaprolactam and, more particularly, to the treatment of that substance to improve its physical characteristics by subjecting it to a comminution, a washing with an aqueous solution of an acid, a drying operation and a degassing operation.

When a polyamide has been obtained by polymerization in the presence of an alkali metal used as a catalyst, it is difficult afterwards to carry out different fabrication operations on the resulting product, particularly when hot extruding using grains of powder obtained by pulverization of this mass. This is especially the case in the case of the polycaprolactam known under the name of "nylon 6." This is, apparently, due to the fact that some catalyst is left in the polymerized material and because, on fusion, an equilibrium is established, the result of which is the formation of a significant proportion of the monomer. Furthermore, with an excess of the alkali metal, which is generally sodium, polymerization initiators are usually used, so that the plastic mass to be treated contains not only the sodium and the monomer but also the residue of the initiator. In general, this results in the formation of numerous gaseous bubbles in the manufactured article. It is, thus, difficult to extrude a polycaprolactam which has been obtained by sodium polymerization without encountering gaseous inclusions in the extruded mass, or even frothing at the exit of the extrusion device. Because these difficulties affect the polyamide products which have been polymerized at low temperature (that is to say, around 150° C. with alkaline catalyst in the presence of an initiator), the practical applications of this polymerization product have been limited to a great extent. These and other difficulties experienced with the prior art processes have been obviated in a novel manner by the present invention.

It is, therefore, an outstanding object of the invention to provide a process for treating a polyamide to produce a product which may be useful in subsequent fabrication steps.

Another object of this invention is the provision of a process for treating polyamides which makes it possible to perform further operations on the liquid polymer without the formation of bubbles or eruptions.

A further object of the present invention is the provision of a process for treating polyamides which will permit one to obtain articles made from the resulting product, which articles will be perfectly homogeneous and will present the normal mechanical characteristics of the polyamide.

It is another object of the instant invention to provide a process for treating a polyamide which has been produced by polymerization with an excess of alkaline metal in the presence of a polymerization initiator in such a manner that it has suitable characteristics for use in extrusion and similar subsequent treatment.

With the foregoing and other objects in view, which will appear as the description proceeds, the invention resides in the combination arrangement of steps and the details of the process hereinafter described and claimed, it being understood the changes in the precise embodiment of the invention herein disclosed may be made within the scope of what is claimed without departing from the spirit of the invention.

Generally speaking, the present inventive process consists of subjecting a comminuted polyamide to acid washing in order to eliminate any remaining alkali metal, in carefully drying the product which has been washed in this manner, and then subjecting it to degasification in such a way as to remove the volatile materials which are present. Various acids may be employed in the acid washing, the acid being in the form of a relatively dilute aqueous solution. Hydrochloric, sulphuric, sulphurous or phosphoric acids may be used, but the organic acids are preferred. For example, acetic, propionic, butyric, oxalic, succinic, maleic, and, particularly, those having a high volatility. The preferred concentrations are in the region from 0.3 to 3.5 equivalents of acid per litre of water. unusually favorable results are obtained with formic acid.

In carrying out a preferred form of the invention, the washing of the polyamide in a divided state consists in treating it with water containing formic acid, concentrations of the acid in the order of 1 to 10% being generally suitable. The washing may be carried out at ordinary temperatures and it is continued until the content of alkali metal in the plastic material reaches at least 0.01% and, preferably, until this content drops below 0.005% by weight. The washing may be accelerated by the use of higher temperatures, advantageously as high as 100° C. Preferably, the washing is carried out by relative movement of the liquid with respect to the comminuted plastic material. Agitation may take place by passage of the water across a bed of the product to be washed, or by other known techniques.

The acid washing, in accordance with the invention, results not only in the elimination of the catalyst remaining in the plastic material but also to a certain extent in the removal of other impurities, principally of the monomer. It has been found, in fact, that the material which is more or less yellowish at the start becomes nearly white at the end of the washing. In one particular manner of carrying out the invention, the decolorization of the polymer may be brought about by treatment with a water vapor containing formic acid at a temperature of about 100° C. An example of such a treatment involves the use of 2% HCOOH in the vapor at 130° C.

A practical test for determining the efficiency of the washing consists in maintaining a sample of the washed material at 230° C. for one and one-half hours under a pressure of 1 millimeter of mercury. The products which distill from these conditions are collected. Experience shows that the washing has been efficacious when the proportion of the distilled products thus collected does not exceed 2%. Preferably, the result of this test should show from 0.5 to 2%.

The comminution of the plastic material before the acid washing may be carried out in any of the ways known in the industry, such as by grinding, cutting, spinning, and so forth. Washing may then be carried out on the powder granules, thin films, threads, or other physically divided forms of the plastic. The duration of the washing depends, among other things, on the shape and on the size of the particles to be treated.

The second step of the present process consists in drying the material after the acid washing. This operational phase is extremely important because the polyamides absorb water to a high degree in a sufficient amount to cause inconvenience in the subsequent shaping of the plastic, such as by thermal forming, injection, blowing, and, in particular, in extrusion. During this step, the temperature (which preferably exceeds 90° C.) is conducted in such a way as to lower the water content of the product to less than 0.1%. Advantageously, the initial drawing is carried out at atmospheric pressure between 90° and 100° C. Afterwards, it is dried by heating under vacuum above 100° C., that is to say, preferably in the range between 115° C. and 150° C. under a lower pressure of around 30 millimeters of mercury, preferably between 10 and 30 millimeters of mercury.

The two-operational phases described above are followed by a degassing step, the purpose of which is to eliminate all the volatile content of the product capable of creating gaseous inclusions in the plastic mass during the final hot working of the plastic. This degassing step consists in general in maintaining the comminuted material (which has already been acid washed and dried) at a sufficiently high temperature to produce volatilization of the undesirable inclusions. This may be done in one of three ways: by affecting the degassing at the same time as or immediately following the drying in the same apparatus where the drying takes place, by carrying it out in the form of a distinct operation on the material coming from the drying process, or (particularly when the material is intended to be shaped by extrusion) in one of the classic forms of apparatus known under the name of "Extruder-Degasser."

The last of the three procedures described above is particularly useful because it takes place at a high temperature (usually from 200° to 270° C.) as the liquid product moves toward the nozzle of the extruder-degasser. This method of operating permits very rapid degassing. It is particularly applicable to the form of the invention in which the mass of the polymer is comminuted by grinding into fine grains which are acid washed and dried as described above in order to supply this material to an extruder-degasser for producing rods which are then cut into granules. Granules produced in this way may be utilized in the various processes for transformation of the plastic into articles.

A degassing step in accordance with the invention may also be carried out on the comminuted material in the solid state by using sufficiently high temperaures, preferably above those used during the dryng step. At that time, it is beneficial to operate under a very much reduced pressure or by passing inert gas into contact with the particles to be degassed. In any case, the degassing must be carried out in such a way that the content of volatile material is reduced to 0.2% by weight and, preferably, below this value.

In order to illustrate the invention, the following two examples are described below.

Example I

The process was carried out on polycaprolactam obtained by polymerization at 150° with 0.2% by weight of sodium and 0.55% by weight of toluene diisocyanate as the initiator. The raw polymer was in the form of blocks 63 centimeters long and 10 centimeters in diameters and was ground into grains of 0.1 to 4 millimeters in size. The grains were agitated with an aqueous solution containing 2% of formic acid at 100° C. for three hours in the proportion of 1 litre of solution per kilogram of plastic. The content of sodium remaining in the grains was 0.003% after the acid washing. The grains of plastic, which were yellow before the acid washing, became nearly white but contained about 6% of water. The washed product was first kept in a drying oven at 95° C. at atmospheric pressure for 10 hours and after that at 135° C. at a pressure reduced to 20 millimeters of mercury. After drying, the granules contained 0.05% of water. The material thus washed and dried was then introduced into an extruder-degasser of the Samafor type in which degassing took place between 230° and 260° C.; the extrusion was carried out at a temperature of about 10° C. higher. A smooth rod was thereby obtained which was free from any gas bubbles and had a good appearance because of its high viscosity. The rods prepared in this manner were cooled in the air, granulated in a Lancelin grinder, the granules were packed in water-tight packages at atmospheric humidity, and they were used for extrusion and injection molding. They provided articles of excellent quality which had no gaseous inclusion.

Example II

The steps which were used in Example I were applied to a polycaprolactam which had been obtained by polymerization of caprolactam at 150° C. in the presence of 0.2% by weight of metallic sodium and of 0.75% of benzene mono-isocyanate as initiator. The resulting granules were substantially as in Example I and were easily utilizable in transformation processes using heat, as in extrusion and injection molding.

While it will be apparent that the illustrated embodiments of the invention herein disclosed are well calculated to adequately fulfill the objects and advantages primarily stated, it is to be understood that the invention is susceptible to variation, modification, and change within the spirit and scope of the subjoined claims.

The invention having been thus described, what is claimed as new and desired to secure by Letter Patent is:

1. A process for treating polycaprolactam prepared by polymerization in the presence of an alkaline metal and in the presence of a polymerization initiator, comprising dividing the polycaprolactam into particles, washing the particles with an aqueous solution of an acid in the range from 0.3 to 3.5 equivalents of acid per liter of water until the alkali content does not exceed 0.01% by weight, drying the particles at a temperature in the range from 90° to 150° C. at less than atmospheric pressure until they contain less than 0.1% by weight of water, and subjecting the dried polycaprolactam particles to degassing until the content of volatile material is reduced to 0.2% by weight or less.

2. A process as recited in claim 1, wherein the said aqueous solution contains an amount in the range from 1% to 10% by weight of formic acid.

3. A process as recited in claim 1, wherein the particles are subjected to the action of water vapor containing formic acid at a temperature in the range from 100° C. to 130° C.

4. A process for treating polycaprolactam prepared by polymerization in the presence of an alkaline metal and in the presence of a polymerization initiator, comprising the steps of dividing the polycaprolactam into particles, washing the particles by the action of a water vapor containing formic acid in the range from 1 to 10% by weight at a temperature in the range from 100° C. to 130° C. until the alkali content does not exceed 0.01% by weight, drying the particles at a temperature in the range from 90° to 150° C. under a pressure less than atmospheric pressure until the particles contain less than 0.1% by weight of water, and subjecting the dried polycaprolactam to degassing until the content of volatile material is reduced to 0.2% by weight or less.

References Cited

UNITED STATES PATENTS

| 3,047,565 | 7/1962 | Braun et al. | 260—78 |
| 3,177,181 | 4/1965 | Baum et al. | 260—78 |
| 3,245,964 | 4/1966 | Wiesner et al. | 260—78 |
| 3,287,322 | 11/1966 | Zimmer et al. | 260—78 |

FOREIGN PATENTS 944,308  12/1963  Great Britain.

WILLIAM H. SHORT, *Primary Examiner.*

H. D. ANDERSON, *Assistant Examiner.*